April 2, 1963 L. R. CHREIST, JR 3,083,997
CONVERTIBLE STROLLER
Filed Feb. 15, 1962 2 Sheets-Sheet 2
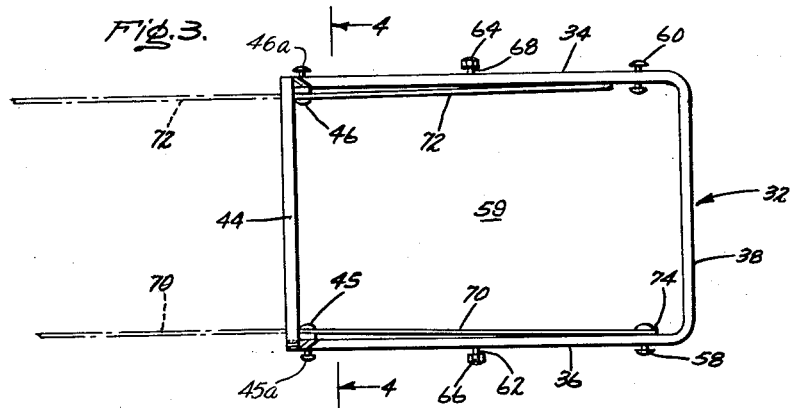
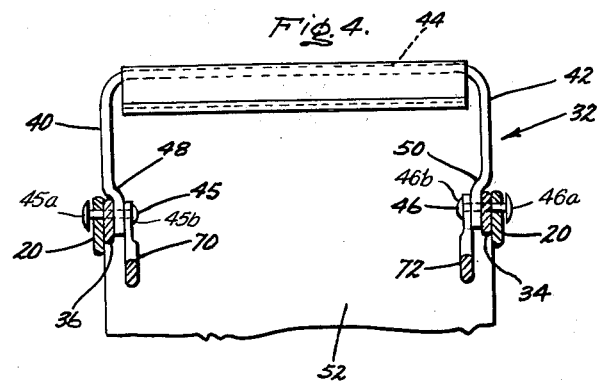
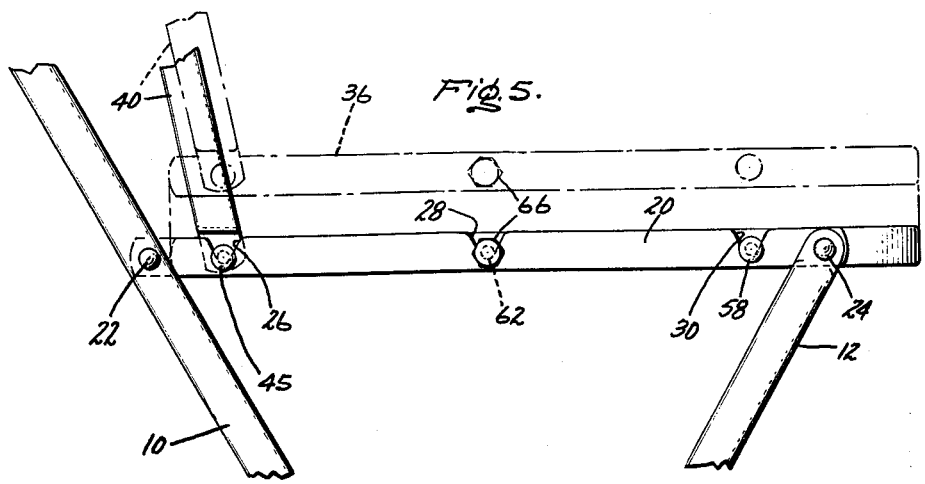
Inventor:
Louis R. Chreist, Jr.
by Hood, Gust & Irish
Attorneys.

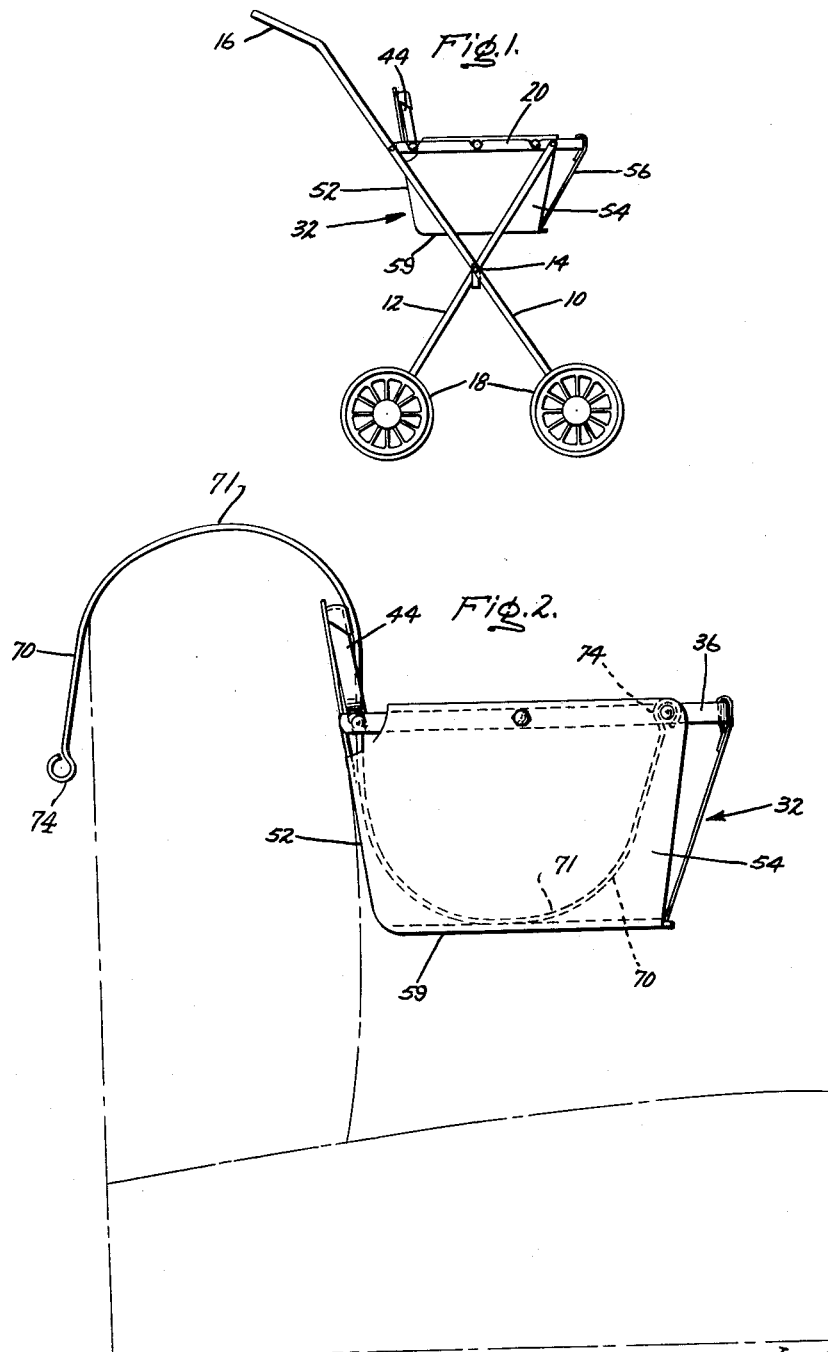

United States Patent Office 3,083,997
Patented Apr. 2, 1963

3,083,997
CONVERTIBLE STROLLER
Louis R. Chreist, Jr., South Bend, Ind., assignor to South Bend Toy Manufacturing Co., Inc., South Bend, Ind.
Filed Feb. 15, 1962, Ser. No. 173,383
4 Claims. (Cl. 297—118)

The present invention relates to a convertible stroller and more particularly to a stroller which may be conveniently converted for mounting on a carriage frame having wheels thereon or alternatively on the backrest of an automobile seat.

Baby or doll strollers conventionally comprise a frame having wheels thereon and a seat-like body which is attached to the frame. Oftentimes it is desirable to transport the stroller in an automobile, in which event the supporting frame is not needed; therefore, it is desirable that the seat-like body which is conventionally mounted on the supporting frame be selectively detachable therefrom whereby it may be conveniently carried in an automobile. Further than this, it is also desirable that some means be provided whereby the seat-like body may be conveniently attached to or detached from the backrest of an automobile seat, the seat-like body being positioned when so attached such that the baby or doll seated in the body will be elevated to about the position of an adult's head and shoulders.

It is therefore an object of this invention to provide a convertible doll stroller which may be easily adapted for use on a carriage frame or mounted on the backrest of an automobile seat.

It is another object of this invention to provide a convertible stroller wherein a mounting device is operatively secured to the stroller body such that it may be used to support the body from the backrest of an automobile seat or in the alternative may be moved to a position within the body where it will be conveniently hidden from view and stored out of the way so that the body may be conveniently used on a carriage frame or the like.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a side elevation of one embodiment of this invention shown mounted on a carriage frame;

FIG. 2 is an enlarged side elevation of this invention shown as being mounted on the backrest of an automobile seat;

FIG. 3 is a top plan view of the embodiment of FIG. 2 with one of the hook members broken away for clarity of illustration;

FIG. 4 is a cross-sectional illustration taken substantially along section line 4—4 of FIG. 3; and FIG. 5 is a fragmentary, enlarged side view of the arrangement of FIG. 1 showing the means for detachably mounting the stroller body on the carriage frame.

Referring to the drawings, and more particularly to FIG. 1, a carriage frame comprises a scissors frame having crossed legs 10 and 12 which are pivotally connected together by means of the rivet 14. While the drawing of FIG. 1 shows only two such legs 10 and 12 on one side, it will be understood that these legs are duplicated on the opposite side of the structure with the legs 10 being joined together at the top to provide a conventional handle 16. Four wheels 18 are mounted on the lower ends of the legs 10 and 12 as shown. Connected to the upper ends of the legs 12 and also to the upper portion of the legs 10 are two horizontally extending mounting bars 20 which are made of self-supporting strap steel or the like. As shown more clearly in FIG. 5, each horizontal bar 20 is connected at its opposite ends to the legs 10 and 12 by means of two rivets 22 and 24 and further are provided with thre horizontaly spaced notches 26, 28 and 30 which are spaced equal distances apart. The reason for this equal spacing will become apparent from the following description.

A stroller body indicated generally by the reference numeral 32 is detachably mounted on the two frame bars 20 which preferably are spaced apart and parallel as shown more clearly in FIG. 4. This body 32 comprises a first U-shaped, horizontally disposed frame having opposite parallel side arms 34 and 36 which are connected together at their front ends by a cross-bar 38. The opposite or rear ends of the side arms 34 and 36 are connected together by a rigid, U-shaped, backrest frame having depending legs 40 and 42 which are connected together at the upper ends thereof by means of a cross-bar 44. The lower ends of these legs 40 and 42 are connected to the rear ends respectively of the side arms 34 and 36 by means of two rivets 45 and 46. Also, the lower ends of the two side arms 40 and 42 are provided with bent portions 48 and 50 whereby the outer sides of the arms 40 and 42 may be abutted against the inner sides of the body arms 34 and 36 as shown in FIG. 4. The bent portions 48 and 50 follow the contours of the two body arms 34 and 36 so as to be engageable therewith, these bent portions thereby constituting a part of the connection of the backrest frame 40, 42 to the body arms 34 and 36. Further, these bent portions 48 and 50 prevent the backrest frame 40, 42 from being pivoted either rearwardly or forwardly with respect to the body frame 34, 36.

Suspended from the U-shaped body frame 34, 36, 38 is a conventional fabric body having a backrest 52, two opposite lateral sides 54, and a front web 56, the lateral sides 54 being suspended from the side arms 34 and 36, respectively, and the web 56 being suspended from the cross-bar 38. The fabric body is also provided with a bottom 59 which is joined to the sides 52 and 54.

The rivets 45 and 46 which connect to the rear ends of the two body arms 34 and 36, respectively, project laterally outwardly as shown more clearly in FIGS. 3 and 4, these rivets having enlarged heads 45a, 45b, and 46a, 46b on the outer ends thereof. In addition to these rivets, another pair of rivets 58 and 60 are fastened to the front ends of the two side arms 34 and 36 as shown and extend both laterally outwardly and inwardly therefrom for a purpose which will be explained more fully hereinafter. These rivets 58 and 60 have enlarged heads on the opposite ends thereof, respectively. Then, mounted intermediate the rivets on the side arms 34 and 36 are a pair of screws 62 and 64 respectively which receive on the outer ends thereof suitable nuts 66 and 68. The rivets and screws on the two side arms are spaced equal distances apart the same as the slots 26, 28 and 30 in the side bars 20 such that these slots will receive these rivets and screws, respectively, as shown in detail in FIG. 5. The nuts 66 may be turned up against the side bars 20 to thereby lock the body frame 34, 36, 38 to the side bars to prevent accidental removal from the carriage frame. When so locked, the side bars 34 and 36 are parallel to the horizontal bars 20 and engage the inner sides thereof, respectively. The nuts 66 draw these side bars 34 and 36 tightly against the horizontal bars 20 thereby securely locking the body 32 in place on the carriage frame. When it is desired to remove the body 32 from the carriage frame, it is only necessary to loosen nuts 66 and lift body 32 upwardly to disengage the rivets and screws from the slots 26, 28 and 30, respectively.

Two hook members 70 and 72 of the same size and shape are fabricated of stiff, self-supporting steel wire and are formed to a substantial U-shape as shown more clearly in FIG. 2. The rear ends of these hooks 70 and 72 are pivotally connected to the rear ends of the side arms 34 and 36 by means of the two rivets 45 and 46, respectively. When these hook members 70 and 72 are swung into the position shown in FIG. 2, they are nested completely within the body 32, the hook members 70 and 72 lying in parallel planes which are contiguous and parallel to the two lateral body sides 54, respectively. The front ends of the two hook members 70 and 72 are provided with eyelets 74 as shown, which fit over the heads of the rivets 58 and 60 which extend laterally inwardly from the two frame arms 34 and 36. The eyelet 74 is shown broken away from the hook member 72 in FIG. 3. When the eyelets 74 are so locked over the two rivets 58 and 60, they are held in place inside the body 32 and are prevented from being accidentally dislodged. Also, when so locked, the bottom portions or bights of the hooks 70 and 72 engage the bottom 59 of the body 32 as shown in FIG. 2 at 71 such that the fabric sides 54 are supported. The body 32 may then be rested on a flat surface without the sides 54 collapsing, the hooks 70, 72 serving as vertical frame supports. Furthermore, with the two hook members 70 and 72 lying completely within the body 36 and immediately adjacent to the body sides 54, they are completely out of the way so that the interior of the body 32 is freely accessible for use.

As already mentioned, the two hook members 70 and 72 lie in substantially parallel planes. While in these planes, they may be pivoted rearwardly about their respective rivets 45 and 46 to a position shown in FIG. 2 whereby they may be hooked over the upper portion of the backrest of an automobile seat so as to suspend the framework and body therefrom. The heads 45b and 46b of the rivets engage the sides of the respective hooks 70 and 72 as clearly shown in FIGS. 3 and 4 thereby substantially maintaining said hooks in the aforesaid planes regardless of the pivoted positions thereof about the respective rivets 45 and 46. Of course, when the stroller body is desired to be used as shown in FIG. 2, it must first be removed from the carriage frame of FIG. 1. Once fitted into this position of FIG. 2, the baby or doll may be seated in the body and thereby be held safely. Also, the baby or doll will be elevated to a position about equal to the shoulders of an adult.

As already explained, the slots 26, 28 and 30 in the side bars 20 of the carriage frame are equally spaced aparts as are the rivets and screws which fit thereinto. By means of this equal spacing, it is possible to reverse the stroller body 32 from that shown in FIG. 1 such that the backrest 52 will face forwardly instead of rearwardly. Thus a baby or doll may be transported while sitting in either a forward or rearward position.

While I have described above the principles of my invention in connection with specific apparatus, it is to be clearly understood that this description is made only by way of example and not as a limitation to the scope of my invention.

What is claimed is:

1. A convertible stroller comprising a U-shaped body frame having two side arms connected together at one end thereof by a cross-bar, a fabric body having opposite lateral substantially parallel sides and a bottom, said body being suspended from said frame, two U-shaped hook members pivotally connected at one end to the ends of said two side arms, respectively, opposite said cross-bar, said hook members being swingable to a position inside said body with the bight thereof being adjacent to said bottom and the opposite ends thereof being adjacent to said sides whereby said bottom may be engaged with said hook members for supporting said body sides, said hook members also lying in planes substantially parallel and adjacent to said sides, respectively, two rivets on said side arms respectively adjacent to said cross-bar, said rivets extending inwardly toward each other, said hook members having eyelets on one end thereof which fit over and are detachably secured to said rivets respectively, said hook members being detachable from said rivets and swingable rearwardly to a position in which they lie in planes parallel to each other and to said sides.

2. A convertible stroller comprising a body frame having two spaced apart and substantially parallel sides which are elongated to provide front and rear ends respectively, a fabric body having opposite sides and a bottom, said body being suspended from said frame with said body sides lying in substantially the same planes as said frame sides, respectively, two U-shaped hook members having opposite ends, respectively, said hook members being pivotally connected at one end thereof to the rear ends, respectively, of said frame sides, said two hook members lying in two planes, respectively, which are substantially parallel to each other and to the planes of said body sides respectively, said two hook members being swingable to first and second positions in the respective planes thereof; in said first position each said hook member lying inside said body adjacent to the respective body side with the bight thereof being adjacent to said bottom and the opposite end thereof terminating adjacent to the front end of the respective frame side, two post members secured to said frame sides adjacent to the front ends thereof respectively, said post members extending inwardly toward each other, said hook members having eyelets on said opposite ends, respectively, which are detachably secured to said two post members, respectively; said hook members in said second position extending rearwardly of said body with the curvatures thereof being inverted whereby they may be hooked over the backrest of an automobile seat; said bottom being engageable with the bights of said hook members for supporting said body sides against collapsing.

3. A convertible stroller comprising a body frame having front and rear portions and including two spaced apart and substantially parallel sides which are elongated to provide front and rear ends respectively, a fabric body having opposite substantailly parallel sides and a bottom, said body being suspended from said frame with said body sides lying in substantially the same planes as said frame sides, respectively, two U-shaped hook members having opposite ends, respectively, means pivotally connecting said hook members at one end thereof to the rear portion of said body frame for swinging movement in spaced-apart substantially parallel planes, respectively, which are substantially parallel to the planes of said body sides, said connecting means including means for maintaining said hook members in said parallel planes of the latter; said two hook members being swingable to first and second positions in the respective planes thereof; in said first position each said hook member lying inside said body adjacent to the respective body side with the bight thereof being adjacent to said bottom and the opposite end thereof terminating adjacent to the front end of the respective frame side, whereby said hook members are stored within said body and are engageable by the lower portions of said body sides, respectively, for reinforcing said sides against inward movement toward each other; said hook members in said second position extending rearwardly of said body with the curvatures thereof being inverted whereby they may be hooked over the backrest of an automobile seat.

4. A convertible stroller comprising a body frame having front and rear portions and including two spaced-apart and substantially parallel sides which are elongated to provide front and rear ends respectively, a fabric body having opposite substantially parallel sides and a bottom, said body being suspended from said frame with said body sides lying in substantially the same planes as said frame sides, respectively, two U-shaped hook members having opposite ends, respectively, means pivotally connecting said hook members at one end thereof to the rear portion of said body frame for swinging movement in spaced-apart substantially parallel planes, respectively, which are substantially parallel to the planes of said body sides, said two hook members being swingable to first and second positions in the respective planes thereof; in said first position each said hook member lying inside said body adjacent the respective body side with the bight thereof being adjacent to said bottom and the opposite end thereof terminating adjacent the front end of the respective frame side; said hook members in said second position extending rearwardly of said body with the curvatures thereof being inverted whereby they may be hooked over the backrest of an automobile seat, and means for holding said hook members in said first position with sufficient force to reinforce said body sides against collapsing under the weight of the aforementioned body frame and body.

References Cited in the file of this patent

UNITED STATES PATENTS

| | | |
|---|---|---|
| D. 140,503 | Geluso | Mar. 6, 1945 |
| 1,377,543 | Alm | May 10, 1921 |
| 2,701,602 | Baker | Feb. 8, 1955 |
| 2,723,709 | Welsh | Nov. 15, 1955 |
| 2,961,248 | Meyers | Nov. 22, 1960 |
| 2,982,562 | Gladstein | May 2, 1961 |
| 2,984,291 | Kostenborder et al. | May 16, 1961 |

FOREIGN PATENTS

| | | |
|---|---|---|
| 1,073,861 | France | Mar. 24, 1954 |